US012372920B2

(12) United States Patent
Son

(10) Patent No.: US 12,372,920 B2
(45) Date of Patent: Jul. 29, 2025

(54) IMAGE FORMING APPARATUS CAPABLE OF PROTECTING CONFIGURATION FOR COOLING DEVELOPING DEVICE

(71) Applicant: KYOCERA Document Solutions Inc., Osaka (JP)

(72) Inventor: Geki Son, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/637,367

(22) Filed: Apr. 16, 2024

(65) Prior Publication Data

US 2024/0345539 A1 Oct. 17, 2024

(30) Foreign Application Priority Data

Apr. 17, 2023 (JP) ................................ 2023-067040

(51) Int. Cl.
*G03G 15/08* (2006.01)
*G03G 21/16* (2006.01)
*G03G 21/20* (2006.01)

(52) U.S. Cl.
CPC ......... *G03G 21/20* (2013.01); *G03G 15/0896* (2013.01); *G03G 21/1676* (2013.01); *G03G 2221/163* (2013.01)

(58) Field of Classification Search
CPC ........... G03G 15/0896; G03G 21/1676; G03G 21/20; G03G 21/206; G03G 2215/0872; G03G 2221/163; G03G 2221/1645
USPC .................................................... 399/94, 119
See application file for complete search history.

(56) References Cited

U.S. PATENT DOCUMENTS

2010/0129107 A1* 5/2010 Takehara ............ G03G 21/206 399/92
2010/0183323 A1* 7/2010 Fujiya ................ G03G 15/0896 399/44
2011/0164896 A1* 7/2011 Hirasawa ............ G03G 21/206 165/104.33
2022/0404760 A1* 12/2022 Son .................... G03G 21/1633

FOREIGN PATENT DOCUMENTS

CN 112083637 A * 12/2020 ......... G03G 21/1623
JP 2020101749 A 7/2020
WO WO-2019198344 A1 * 10/2019

* cited by examiner

*Primary Examiner* — Robert B Beatty
(74) *Attorney, Agent, or Firm* — Alleman Hall & Tuttle LLP

(57) ABSTRACT

An image forming apparatus includes a developing device, a separating mechanism, and a cooling unit. The developing device includes a developing roller and a developing housing, and is detachably supported by a support frame. The separating mechanism separates the developing roller from a photoconductor drum before the developing device is removed from the support frame. The cooling unit cools the developing device. The developing housing has a bottom plate with high thermal conductivity. The cooling unit includes a heat receiving plate facing the bottom plate, and a cooling tube supported by the heat receiving plate. In the image forming apparatus, when the developing roller is not separated, the bottom plate comes in contact with the cooling tube, and when the developing roller is separated, the bottom plate is separated from the cooling tube.

5 Claims, 12 Drawing Sheets

IMAGE FORMING APPARATUS CAPABLE OF PROTECTING CONFIGURATION FOR COOLING DEVELOPING DEVICE

INCORPORATION BY REFERENCE

This application is based upon and claims the benefit of priority from the corresponding Japanese Patent Application No. 2023-067040 filed on Apr. 17, 2023, the entire contents of which are incorporated herein by reference.

BACKGROUND

The present disclosure relates to an image forming apparatus including a cooling unit that cools a developing unit (developing device).

An electrophotographic image forming apparatus includes a developing unit that develops a latent image formed on a photoconductor drum using a developing agent carried on a developing roller. The developing unit is detachably supported by a support frame for maintenance and replacement. In addition, in the developing unit, frictional heat is generated due to rotation of the developing roller and stirring of the developing agent, and the temperature of the developing agent increases. An increase in the temperature of the developing agent may affect charging properties of the developing agent, resulting in a risk of a decrease in image quality. Therefore, the image forming apparatus is equipped with a cooling unit that cools the developing unit.

More specifically, a cooling unit including a heat receiving tube that comes into contact with an object to be cooled (corresponding to a developing unit) and receives heat from the object to be cooled is known as related technology.

SUMMARY

An image forming apparatus according to the present disclosure includes a photoconductor drum, a developing device, a separating mechanism, and a cooling unit. The photoconductor drum is supported by a support frame, and an electrostatic latent image is formed on the photoconductor drum. The developing device is detachably supported by the support frame and includes a developing roller that develops the electrostatic latent image formed on the photoconductor drum with a developing agent, and a developing housing that accommodates the developing agent. The separating mechanism moves the developing device so that the developing roller is separated from the photoconductor drum before the developing device is removed from the support frame. The cooling unit cools the developing device. The developing housing has a bottom plate that has higher thermal conductivity than other parts. The cooling unit includes a heat receiving plate facing the bottom plate, and a cooling tube supported by the heat receiving plate. In the image forming apparatus, in a state where the developing device is not being moved by the separating mechanism, the bottom plate comes in contact with the cooling tube and the cooling unit cools the developing device; and when the developing device is moved by the separating mechanism before the developing device is removed from the support frame, the bottom plate is separated from the cooling tube.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An image forming apparatus of an embodiment according to the present disclosure will be described below with reference to the drawings.

An overall configuration of an image forming apparatus 1 will be described with reference to FIGS. 1, 2A, and 2B.

Figure 1:
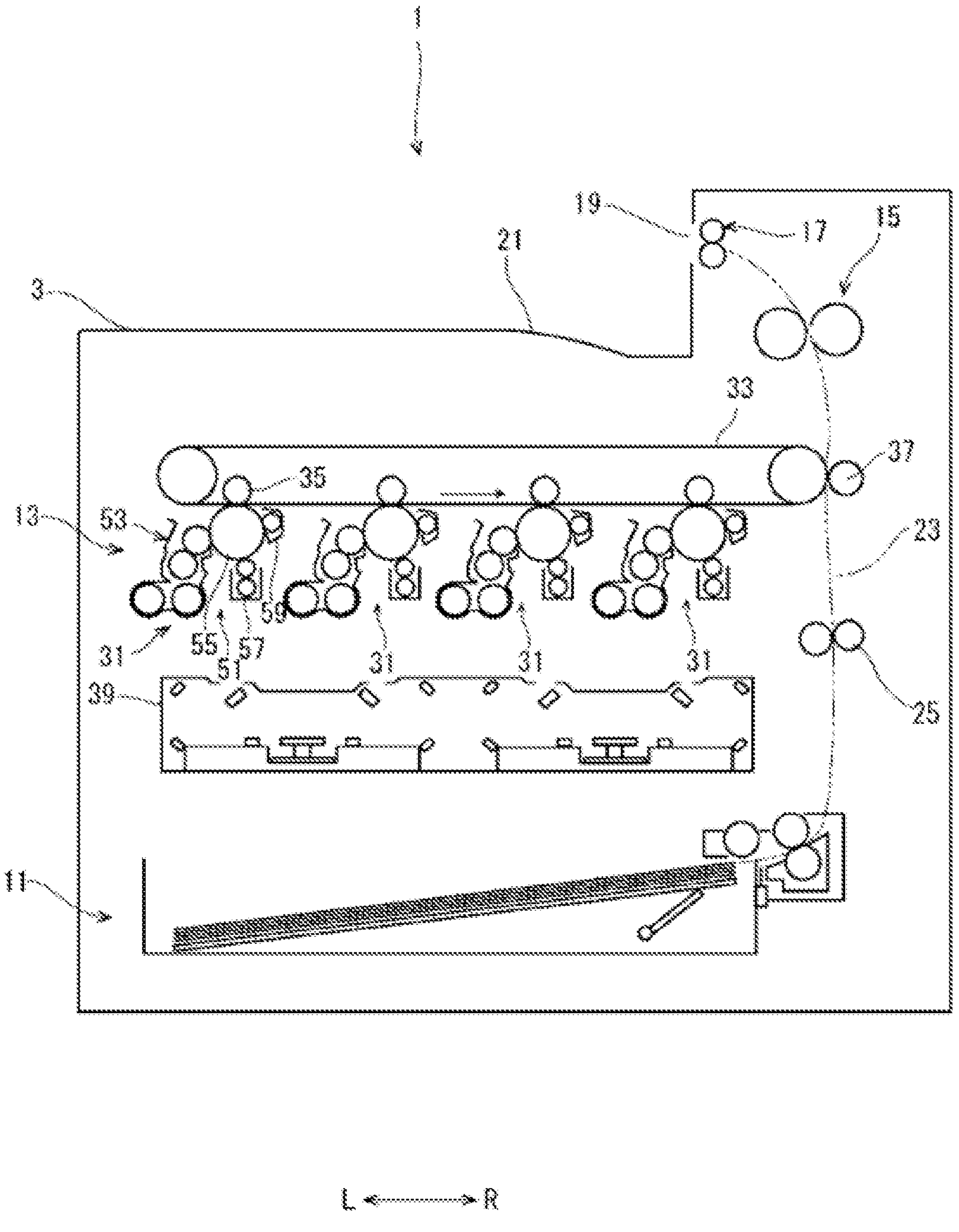
FIG. 1 is a front view schematically showing an internal configuration of an image forming apparatus of an embodiment according to the present disclosure.
Figure 2A:
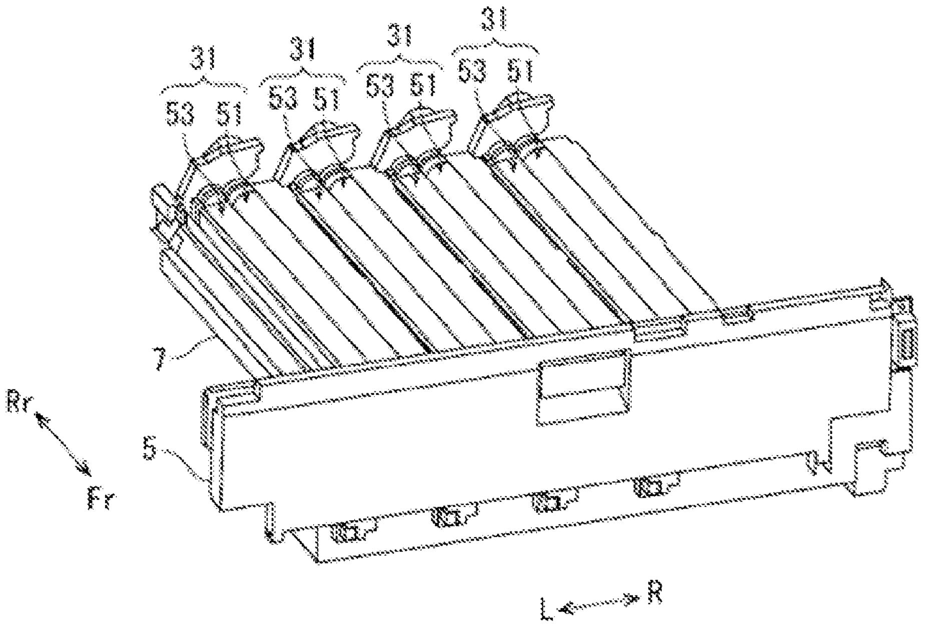
FIG. 2A is a perspective view showing a developing device and a drum unit supported by a support frame, and an inner cover rotated upward in an image forming apparatus of an embodiment according to the present disclosure.
Figure 2B:
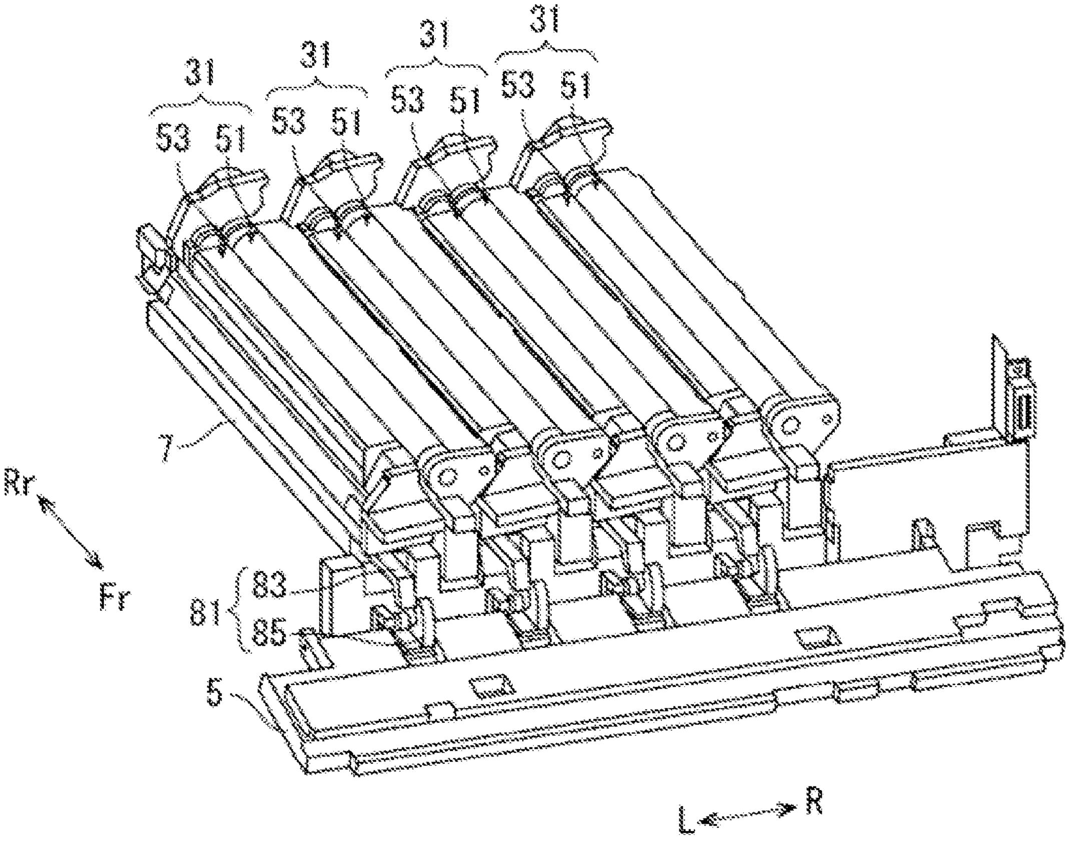
FIG. 2B is a perspective view showing a developing device and a drum unit supported by a support frame, and an inner cover rotated downward in an image forming apparatus of an embodiment according to the present disclosure.

FIG. 1 is a front view schematically showing an internal configuration of the image forming apparatus 1, and FIGS. 2A and 2B are perspective views showing a support frame 7 and an inner cover 5. Fr, Rr, L, and R shown in each figure indicate the front side, rear side, left side, and right side of the image forming apparatus 1, respectively.

As shown in FIG. 1, the image forming apparatus 1 includes a housing 3 having a substantially rectangular parallelepiped hollow portion. An opening (not shown) is formed in an upper portion of a front surface of the housing 3. The opening is opened and closed by an outer cover (not shown) that is rotatably supported around a lower end portion. Furthermore, the inner cover 5 (not shown in FIG. 1, see FIGS. 2A and 2B) is provided inside the outer cover and is rotatably supported around a lower end portion. A rectangular plate-shaped support frame 7 is provided inside the inner cover 5 so as to partition the hollow portion of the housing 3 into upper and lower portions.

The hollow portion of the housing 3 accomodates a sheet feed portion 11 that feeds sheets, an image forming portion 13 that forms a toner image to be transferred to the sheet, a fixing portion 15 that fixes the toner image to the sheet, and a discharge portion 17 that discharges the sheet on which the image has been fixed. The sheet feed portion 11 is provided at the lower portion of the hollow portion of the housing 3. The image forming portion 13 is provided above sheet feed portion 11. The fixing portion 15 is provided above the image forming portion 13, and the discharge portion 17 is provided above the fixing portion 15. In addition, on an upper surface of the housing 3, there are provided a discharge port 19 through which sheets are discharged, and a discharge tray 21 on which sheets discharged from the discharge port 19 are stacked.

Furthermore, a sheet conveying path 23 is formed in the hollow portion of the housing 3, and extends from the sheet feed portion 11 through the image forming portion 13 and the fixing portion 15 to the discharge portion 17. The conveying path 23 is provided with a registration roller pair 25 farther on an upstream side in the sheet conveying direction than the image forming portion 13.

Figure 7:
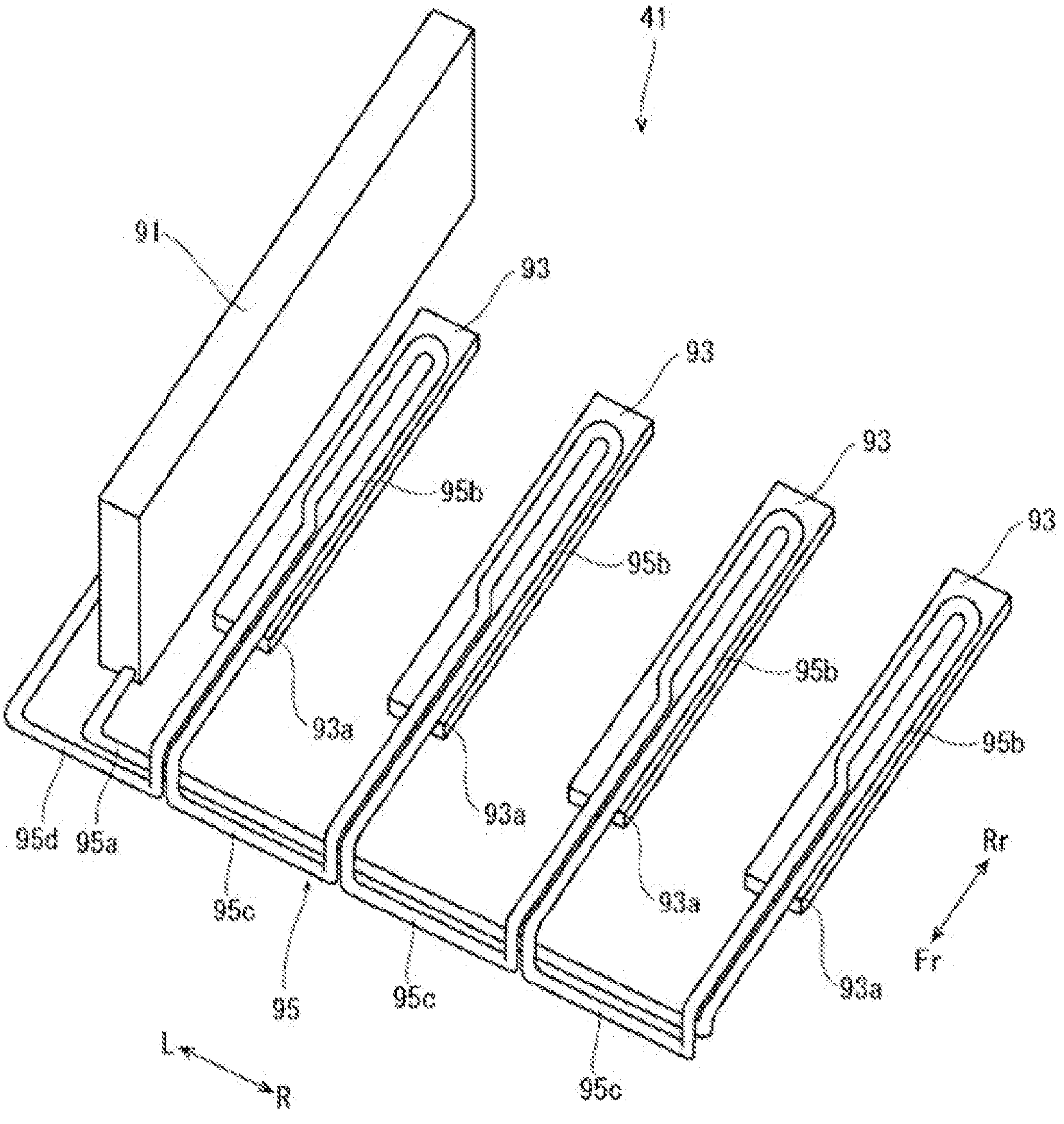
FIG. 7 is a perspective view schematically showing a cooling unit in an image forming apparatus of an embodiment according to the present disclosure.

The image forming portion 13 includes four image forming units 31 corresponding to toner of four colors (yellow, cyan, magenta, black), an intermediate transfer belt 33, four primary transfer rollers 35 corresponding to the four image forming units 31, a secondary transfer roller 37, an exposure device 39, and a cooling unit 41 (not shown in FIG. 1, see FIG. 7). The cooling unit 41 will be described later.

Each of the four image forming units 31 includes a drum unit 51 and a developing device 53. The drum unit 51 includes a rotatable photoconductor drum 55, a charging device 57, and a cleaning device 59.

As shown in FIGS. 2A and 2B, the image forming units 31 (drum units 51 and developing devices 53) are supported by the support frame 7. The support frame 7 is partitioned into four sections arranged side by side to the left and right for each image forming unit 31. In each section, a developing device support portion that supports the developing device 53 and a drum unit support portion that supports the drum unit 51 are provided side by side to the left and right. When the outer cover and the inner cover 5 are opened, the image forming units 31 supported by the support frame 7 are exposed through an opening on a front surface of the housing 3. Each developing device 53 is removable from the developing device support portion through the opening along a direction from the rear to the front. The developing device 53 will be described later.

Referring again to FIG. 1, the intermediate transfer belt 33 is arranged above the four image forming units 31, is wound between a drive roller and a driven roller that are arranged spaced apart from each other in the left-right direction, and travels in a direction shown by an arrow in FIG. 1. An outer surface of a track on a lower side of the intermediate transfer belt 33 faces the photoconductor drums 55 of the four image forming units 31, forming a primary transfer nips between the photoconductor drums 55 and the intermediate transfer belt 33. The four primary transfer rollers 35 are arranged in the hollow portion of the intermediate transfer belt 33 and face the primary transfer nips. The secondary transfer roller 37 faces the drive roller with the intermediate transfer belt 33 in between, and forms a secondary transfer nip between the secondary transfer roller 37 and the intermediate transfer belt 33. The conveying path 23 passes through this secondary transfer nip. The exposure device 39 is arranged below the support frame 7 (see FIG. 2) and can expose the photoconductor drums 55 through an opening (not shown) provided in the support frame 7.

The image forming operation will be briefly explained. In each image forming unit 31 of the image forming portion 13, a charging device 57 charges the photoconductor drum 55 to a predetermined potential. After that, the photoconductor drum 55 is exposed by the exposure device 39 based on image data to form an electrostatic latent image. The electrostatic latent image is developed into a toner image by a developing device 53. The toner image is transferred from the photoconductor drum 55 to the intermediate transfer belt 33 in the primary transfer nip by the primary transfer roller 35 to which a transfer bias is applied. A full-color toner image is formed on the intermediate transfer belt 33 by each of the four image forming units 31 transferring a toner image onto the intermediate transfer belt 33.

On the other hand, the sheet is fed from the sheet feed portion 11 to the conveying path 23. The sheet is conveyed along the conveying path 23, and after skew of the sheet is corrected by a registration roller pair 25, the sheet is conveyed to the secondary transfer nip. In the secondary transfer nip, a full-color toner image is transferred from the intermediate transfer belt 33 to the sheet by the secondary transfer roller 37 to which a transfer bias is applied. After that, the sheet is conveyed to the fixing portion 15, and the toner image is heated and pressurized to be fixed on the sheet. The sheet is conveyed to the discharge portion 17 and discharged by the discharge portion 17 to the discharge tray 21 through the discharge port 19.

Figure 3A:
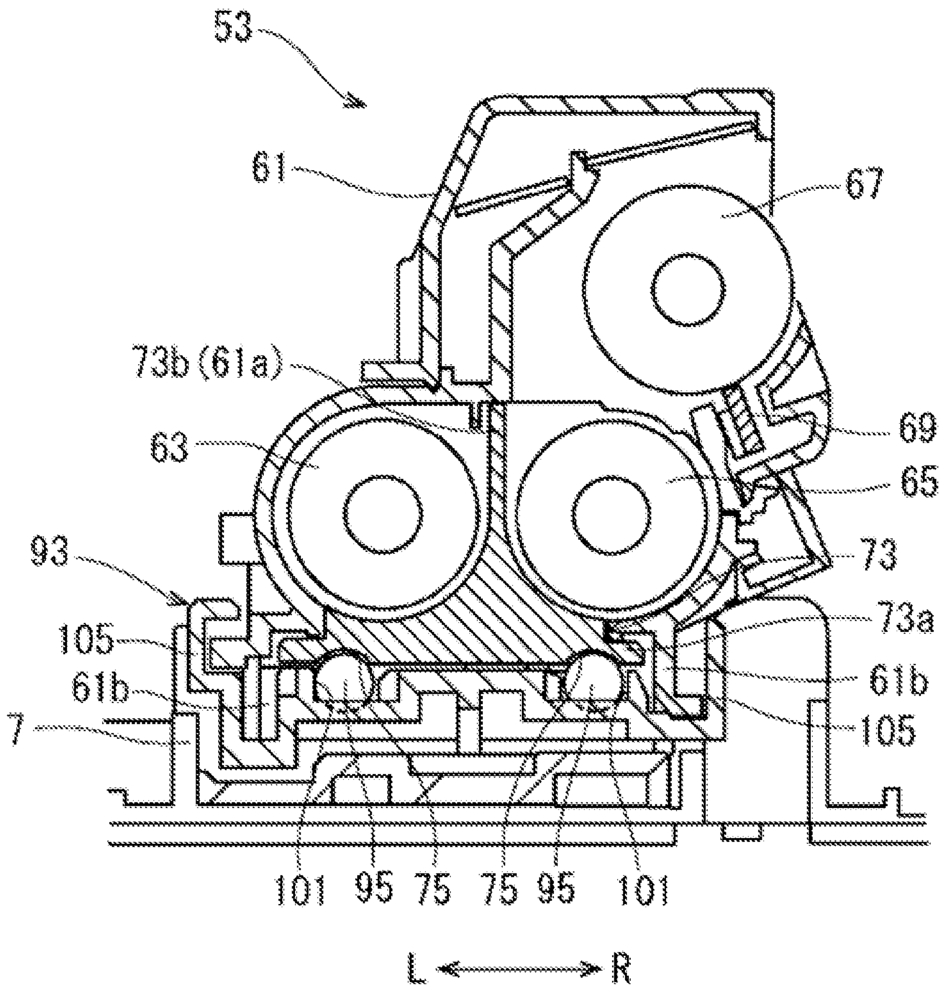
FIG. 3A is a front view showing a developing device pivotted to a developing position in an image forming apparatus of an embodiment according to the present disclosure.
Figure 3B:
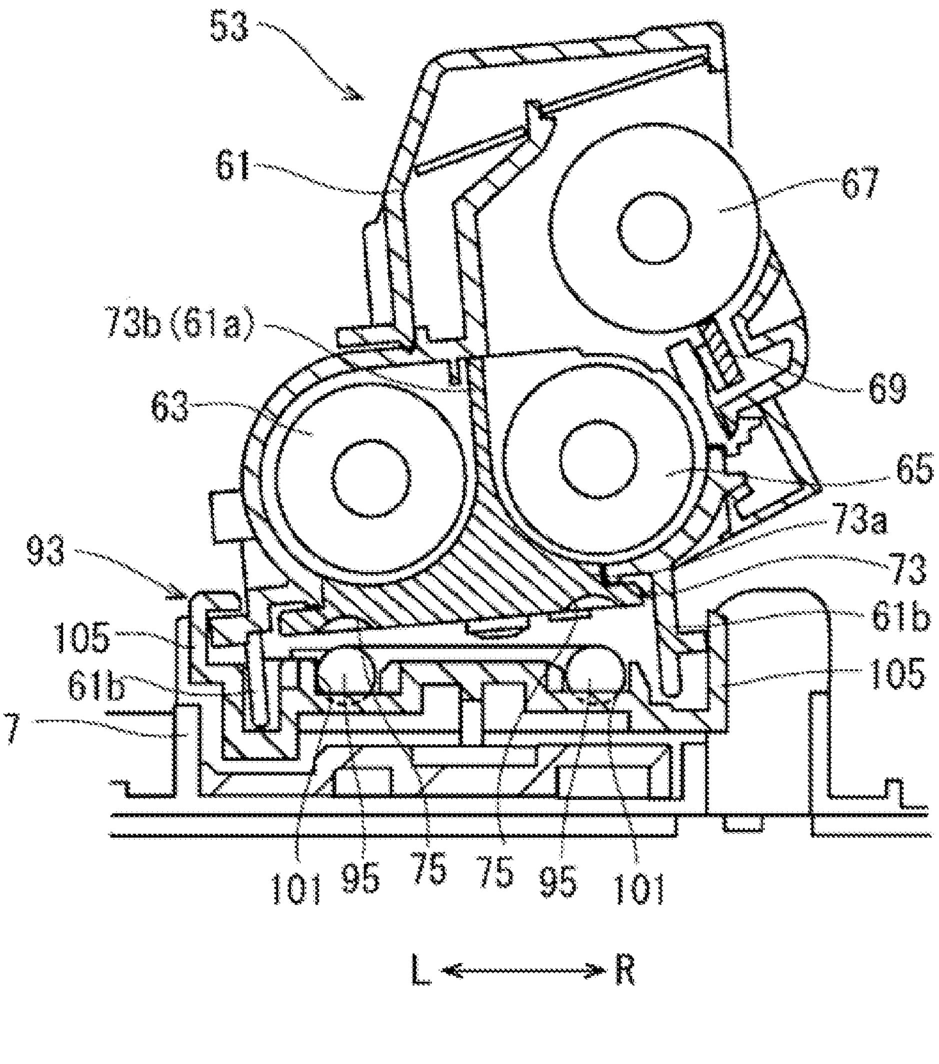
FIG. 3B is a front view showing a developing device pivotted to a separated position in an image forming apparatus of an embodiment according to the present disclosure.
Figure 4:
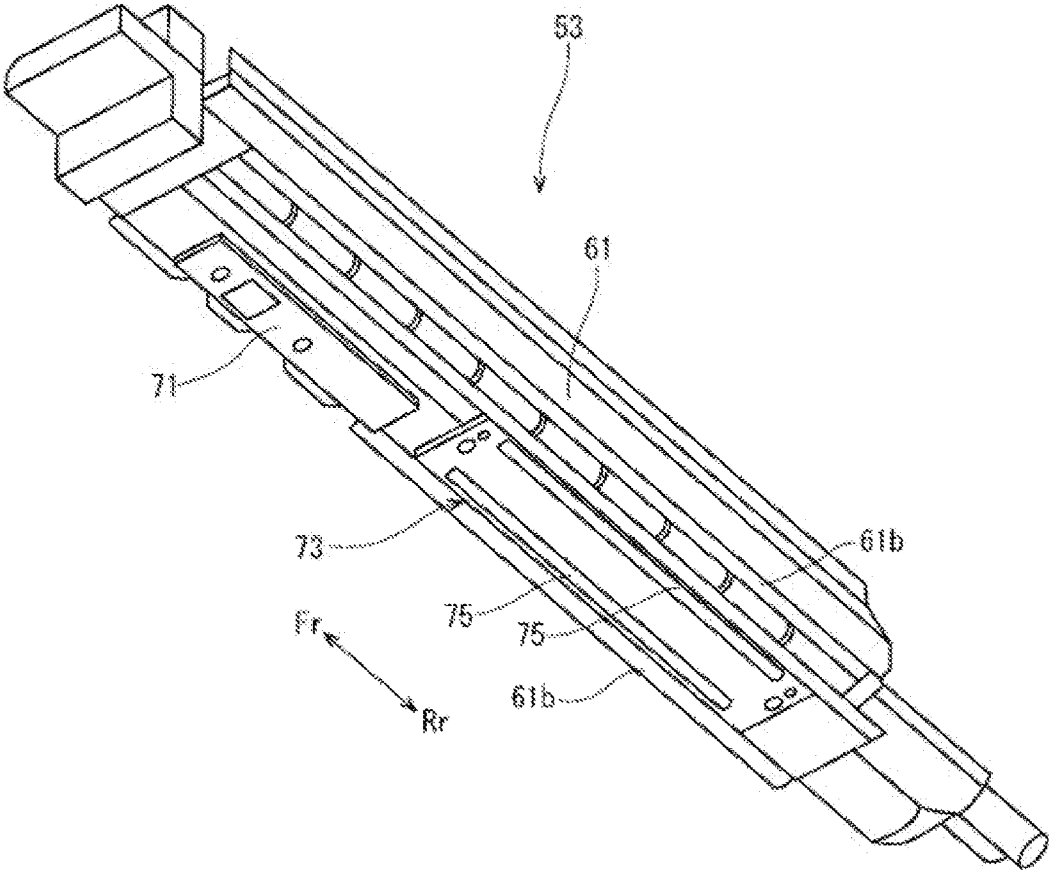
FIG. 4 is a perspective view of a developing device viewed from below in an image forming apparatus of an embodiment according to the present disclosure.

Next, the developing device (developing unit) 53 will be explained with reference to FIGS. 3A, 3B, and 4. FIGS. 3A and 3B are front views showing the developing device 53, and FIG. 4 is a perspective view of the developing device 53 seen from below.

As shown in FIGS. 3A and 3B, the developing device 53 includes a developing housing 61. The developing housing 61 supports a stirring roller 63, a supply roller 65, a developing roller 67, and a blade 69. An opening that faces the photoconductor drum 55 of the drum unit 51 is formed in the developing housing 61. A lower portion of an inner portion of the developing housing 61 is partitioned into two roller storage chambers by a partition wall 61*a* extending in the front-rear direction. In addition, left and right engaging pieces 61*b* are provided on a lower surface of the developing housing 61 and are spaced apart from each other in the left-right direction. Furthermore, a supply port (not shown) through which toner is supplied from a toner container (not shown) is provided at a rear portion of the developing housing 61. The developing housing 61 is made of resin, for example.

The stirring roller 63 is housed in one roller storage chamber and is rotatably supported by the developing housing 61. The supply roller 65 is housed in the other roller storage chamber and is rotatably supported by the developing housing 61. The developing roller 67 is arranged above the supply roller 65 so that a portion thereof is exposed through the opening, and is rotatably supported by the developing housing 61. The blade 69 is arranged at a predetermined distance from the developing roller 67 and is fixed to the developing housing 61.

The toner supplied to the developing housing 61 from a toner container (not shown) is stirred and charged while being conveyed by the stirring roller 63 and the supply roller 65. The developing agent including the charged toner is supplied from the supply roller 65 to the developing roller 67, and a magnetic brush is formed on a surface of the developing roller 67. A layer thickness of the magnetic brush is regulated by the blade 69. The electrostatic latent image formed on the photoconductor drum 55 is developed by the toner included in the magnetic brush thus formed.

As shown in FIG. 4, a toner density sensor 71 that detects the density of toner in the developing housing 61 is attached to the lower surface of a front half portion of a bottom portion of the developing housing 61. Generally, the developing agent is supplied from a toner container (not shown) to a rear portion of the developing housing 61, and is stirred while being conveyed forward by the stirring roller 63 described above. Therefore, the toner density is stabilized at a front portion of the developing housing 61. The toner density sensor 71 is arranged so as to detect the toner density of the developing agent in the front portion of the developing housing 61.

Further, a rectangular opening is formed along the longitudinal direction in a rear half portion of the bottom portion of the developing housing 61. A bottom plate 73 is fixed to the opening. The bottom plate 73 is made of a material (for example, aluminum) that has higher thermal conductivity than the resin that is the material of the developing housing 61.

Figure 5:
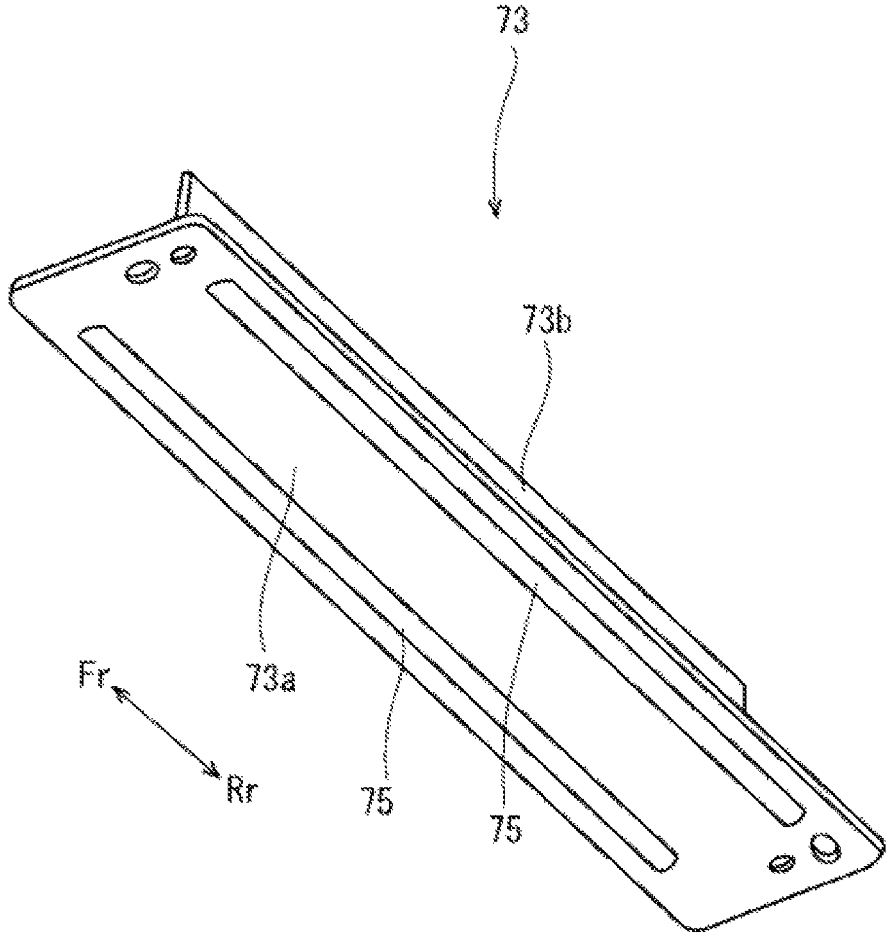
FIG. 5 is a perspective view of a bottom plate of a developing device viewed from below in an image forming apparatus of an embodiment according to the present disclosure.

The bottom plate 73 will be described with reference to FIG. 5. FIG. 5 is a perspective view of the bottom plate 73 viewed from below. The bottom plate 73 has a rectangular flat plate portion 73*a* that is larger than the opening, and a wall portion 73*b* that is formed along the longitudinal direction on an upper surface of the flat plate portion 73*a*. Two recessed portions 75 having a substantially semicircular cross-sectional shape are formed along the longitudinal direction on a lower surface of the flat plate portion 73*a*. Each recessed portion 75 has an arc shape with approximately the same radius as a cooling tube 95 of the cooling unit 41 (see FIG. 7), which will be described later. By the flat plate portion 73*a* being screwed to the bottom portion of the developing housing 61, for example, the bottom plate 73 closes the opening and is fixed to the developer housing 61. When the bottom plate 73 is fixed to the developing housing 61 in this manner, the wall portion 73*b* is continuous with the partition wall 61*a* of the developing housing 61.

The developing device 53 is supported by a developing device support portion of the support frame 7 so as to be able to pivot in the counterclockwise direction in FIGS. 3A and 3B from a developing position where the developing roller 67 exposed through the opening of the developing housing 61 is close to the photoconductor drum 55 (see FIG. 3A) to a separated position where the developing roller 67 is separated from the photoconductor drum 55 (see FIG. 3B). As mentioned above, the developing device 53 is removably supported by the support frame 7 for maintenance or replacement. In a case where the developing roller 67 and the photoconductor drum 55 are in contact with each other when the developing device 53 is removed and installed, there is a risk that the photoconductor drum 55 will be damaged by the developing roller 67 and the like. Therefore, when the developing device 53 is removed and installed, the separating mechanism causes the developing device 53 to pivot from the developing position (see FIG. 3A) to the separated position (see FIG. 3B).

Figure 6A:
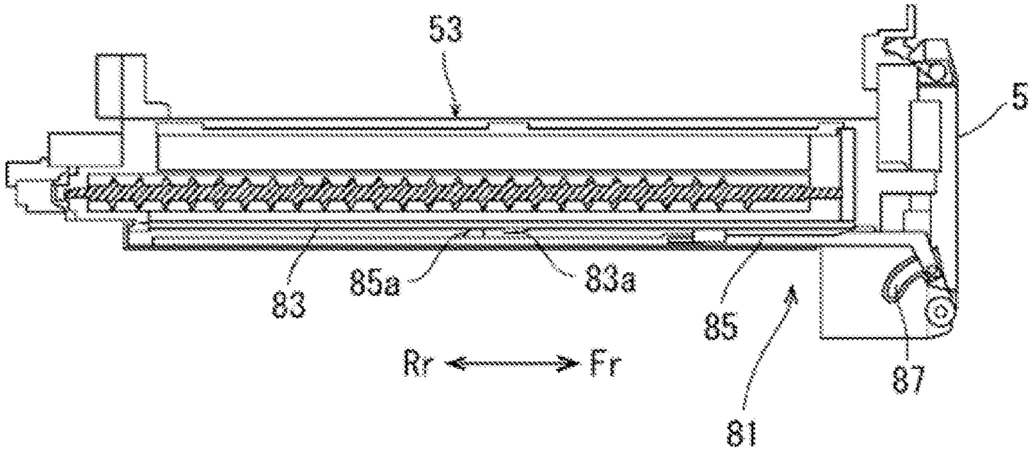
FIG. 6A is a side view showing a separating mechanism (in a state where the developing device is pivotted to a developing position) in an image forming apparatus of an embodiment according to the present disclosure.
Figure 6B:
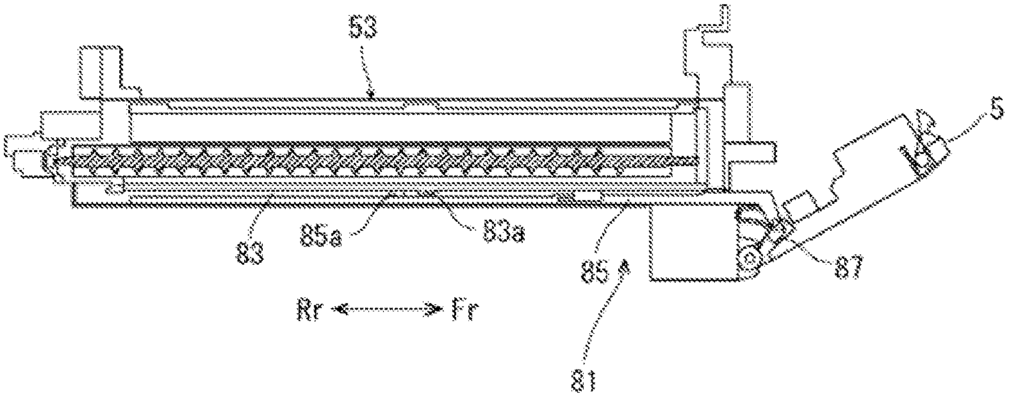
FIG. 6B is a side view showing a separating mechanism (in a state in which the developing device is pivotted to a developing position) in an image forming apparatus of an embodiment according to the present disclosure.
Figure 6C:
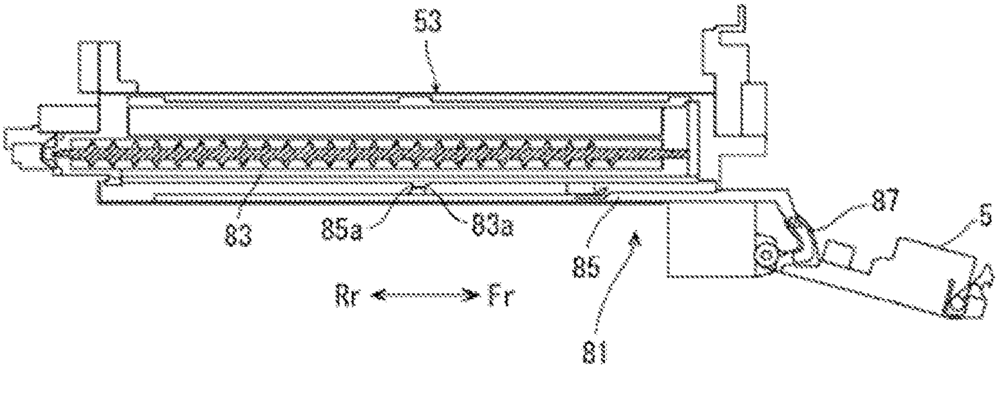
FIG. 6C is a side view showing the separating mechanism (in a state in which the developing device is pivotted to a separation position) in the image forming apparatus of an embodiment according to the present disclosure.

Next, an example of the separating mechanism 81 will be briefly described with reference to FIGS. 6A to 6C. FIGS. 6A to 6C are side views showing the separating mechanism 81. The separating mechanism 81 includes a developing holder 83, a slide member 85, and a link member 87. The separating mechanism 81 is not shown in FIGS. 3A and 3B.

The developing holder 83 is a frame-shaped member that supports the developing device 53 and is supported by the developing device support portion of the support frame 7. The toner density sensor 71 and the bottom plate 73 of the developing device 53 are exposed downward from the developing holder 83. In addition, left and right engaging pieces 61*b* formed on the developing housing 61 protrude downward from the developing holder 83. An upper protruding portion 83*a* that protrudes downward is formed at a right end portion of a lower surface of the developing holder 83 (farther outside than the engaging piece 61*b* on the right side).

The slide member 85 is a rod-shaped member that is long in the longitudinal direction of the developing device 53. The slide member 85 has a lower protruding portion 85*a* that protrudes upward. The slide member 85 is arranged such that the lower protruding portion 85*a* and the upper protruding portion 83*a* of the developing holder 83 overlap in the front-rear direction. The slide member 85 is supported by the right end portion of the developing device support portion of the support frame 7 below the developing holder 83 so as to be movable in the front-rear direction. The link member 87 connects the slide member 85 and the inner cover 5.

As shown in FIG. 6A, in a state in which the inner cover 5 is completely closed, the lower protruding portion 85*a* of the slide member 85 is spaced rearward from the upper protruding portion 83*a* of the developing holder 83, and the developing device 53 is pivotted to the developing position shown in FIG. 3A. As shown in FIG. 6B, when the inner cover 5 is opened to a predetermined position, the lower protruding portion 85*a* of the slide member 85 remains spaced rearward from the upper protruding portion 83*a* of the developing holder 8, and the developing device 53 is maintained at the developing position shown in FIG. 3A. As shown in FIG. 6C, when the inner cover 5 is completely opened, the slide member 85 is moved forward by a link member 87, and the lower protruding portion 85*a* of the slide member 85 moves below the upper protruding portion 83*a* of the developing holder 83, and the right end portion of the developing device 53 is lifted by the slide member 85. Thus, the developing device 53 pivots to the separated position shown in FIG. 3B.

By completely opening the inner cover 5 in this way, the developing device 53 is exposed from the opening of the housing 3 and the developing roller 67 is separated from the photoconductor drum 55. Therefore, by pulling out the developing device 53 forward after completely opening the inner cover 5, the developing device 53 can be taken out without the developing roller 67 interfering with the photoconductor drum 55.

A cooling unit including a heat receiving tube that comes in contact with the developing device 53 and receives the heat of the developing device 53 is known as related technology.

However, in the cooling unit according to the related technology, when the developing device 53 is pulled out from the support frame 7, the developing device 53 may come into contact with the heat receiving tube, and the heat receiving tube may be damaged.

In contrast, in the image forming apparatus 1 of an embodiment according to the present disclosure, as will be described below, it is possible to protect the configuration for cooling the developing device 53 when the developing device 53 is attached or pulled out.

Next, the cooling unit 41 will be explained with reference to FIG. 7. FIG. 7 is a perspective view schematically showing the cooling unit 41. The cooling unit 41 includes a heat dissipating portion 91, a heat receiving plate 93 provided for each of the four developing devices 53 (see FIG. 2A, etc.), and one cooling tube 95 that passes from the heat dissipating portion 91 through the four heat receiving plates 93 and returns to the heat dissipating portion 91.

First, the heat dissipating portion 91 will be explained. The heat dissipating portion 91 includes a tank that stores cooling water, a cooling fan that cools the cooling water, a pump that pumps the cooling water from the tank to the cooling tube 95, and the like (all are not shown). The heat dissipating portion 91 is arranged on a side (for example, the left side) of the support frame 7.

Figure 8:
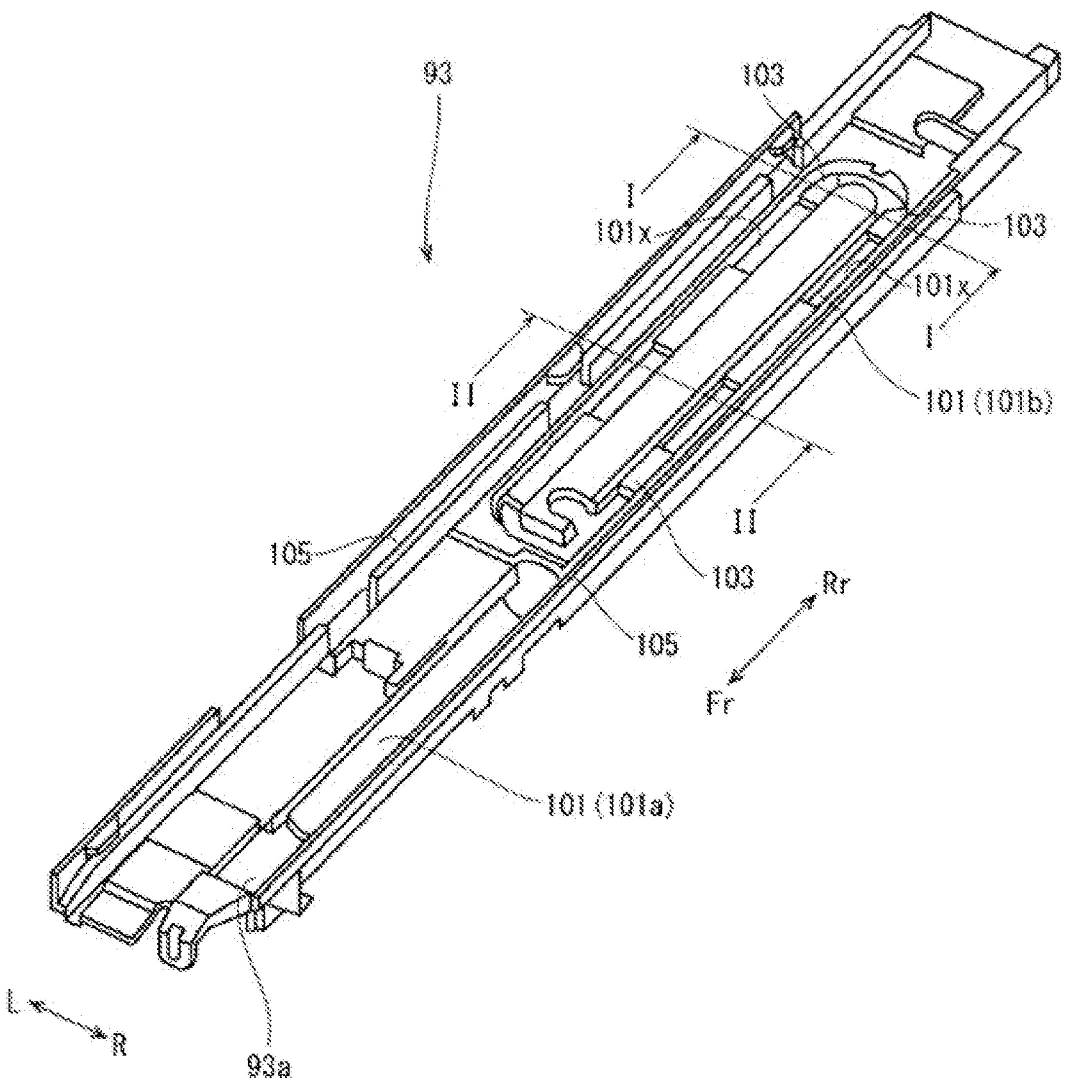
FIG. 8 is a perspective view showing a heat receiving plate of a cooling unit in an image forming apparatus of an embodiment according to the present disclosure.
Figure 9A:
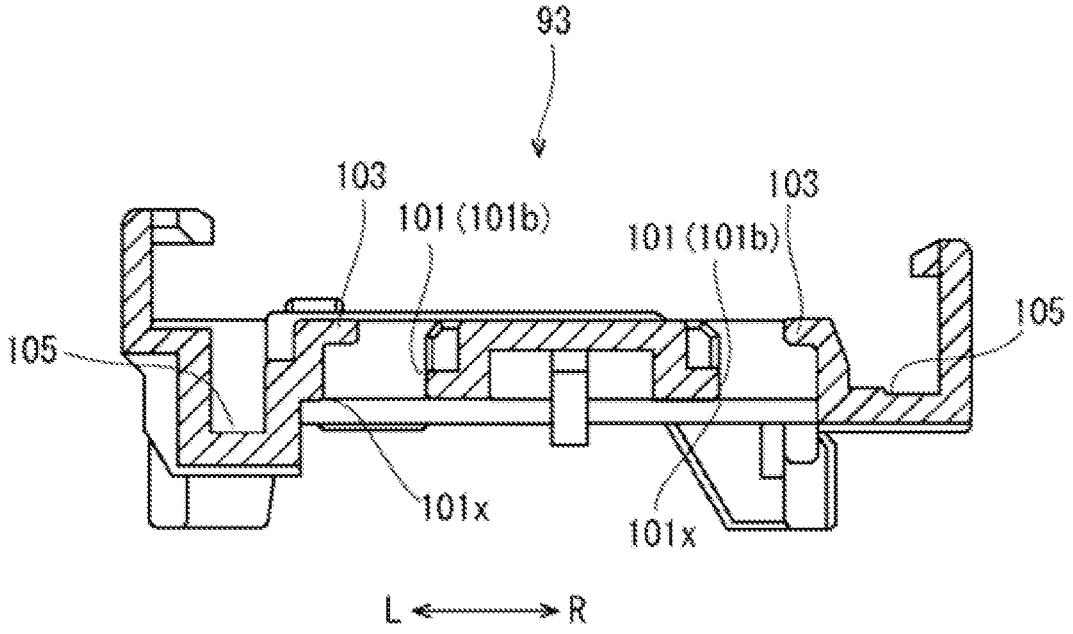
FIG. 9A is a cross-sectional view taken along line I-I in FIG. 8.
Figure 9B:
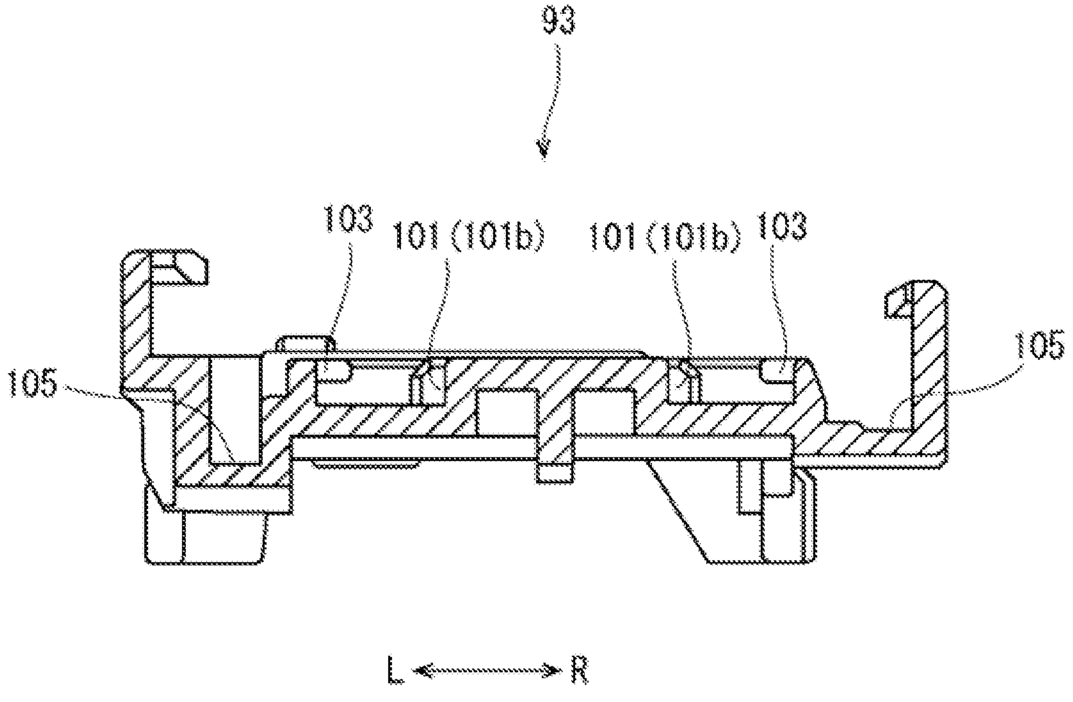
FIG. 9B is a cross-sectional view taken along line II-II in FIG. 8.

Next, the heat receiving plate 93 will be explained with reference to FIGS. 8, 9A, and 9B. FIG. 8 is a perspective view showing the heat receiving plate 93, and FIGS. 9A and 9B are cross-sectional views showing the heat receiving plate 93.

The heat receiving plate 93 is a rectangular plate member facing the bottom portion of the developing housing 61 of the developing device 53, and is made of a material with high thermal conductivity. The heat receiving plate 93 is supported by each developing device support portion of the support frame 7 (below the developing holder 83 of the separating mechanism 81 and on the side of the slide member 85).

As shown in FIG. 8, the heat receiving plate 93 is formed with a groove 101 in which the cooling tube 95 is accommodated. A notch 93*a* that serves as an inlet and an outlet of the cooling tube 95 is formed at a right end portion of the front end of the heat receiving plate 93. The groove 101 has a straight portion 101*a* communicating with the notch 93*a* and an annular portion 101*b* communicating with the straight portion 101*a*. The straight portion 101*a* has a width approximately twice a diameter of the cooling tube 95, and extends in the front-rear direction along the right end portion of the front half portion of the heat receiving plate 93. The annular portion 101*b* has a width approximately equal to the diameter of the cooling tube 95, and is formed in the rear half portion of the heat receiving plate 93 in an annular shape. In this way, the groove 101 is arranged in the front half portion of the heat receiving plate 93 to avoid the toner density sensor 71 attached to the lower surface of the developing housing 61, and in the rear half portion of the heat receiving plate 93, the groove 101 is arranged so as to face the bottom plate 73 attached to the bottom portion of the developing housing 61.

In addition, the heat receiving plate 93 is provided with a fixing piece 103 that protrudes inside the groove 101 at a predetermined position. As shown in FIG. 9A, an opening 101*x* is formed in the bottom surface of the groove 101 near the fixed piece 103. On the other hand, as shown in FIG. 9B, the bottom surface of the groove 101 is closed at locations where the fixing piece 103 is not provided.

Furthermore, right and left rails 105 along the front-rear direction are formed on both sides of the groove 101 in the heat receiving plate 93. The left and right engaging pieces 61*b* of the developing housing 61 protruding from the developing holder 83 of the separating mechanism 81 are engaged with left and right rails 105, and the developing device 53 is supported by the heat receiving plate 93. When the developing device 53 is pulled out and installed, the engaging piece 61*b* is guided forward and rearward along the rail 105. Note that when the developing device 53 is pivotted to the separated position by the above-mentioned separating mechanism 81, the left and right engaging pieces 61*b* move upward within the left and right rails 105 (see FIGS. 3A and 3B).

Next, the cooling tube 95 will be explained with reference again to FIG. 7. The cooling tube 95 is made of a thermally conductive and elastic material such as rubber, and has a radius of 6 mm, for example. An outgoing portion 95*a* of the cooling tube 95 is arranged between the heat dissipating portion 91 and the notch 93*a* of the heat receiving plate 93 which is farthest from the heat dissipating portion 91 (farthest to the right). A heat receiving portion 95*b* connected to the outgoing portion 95*a* is accommodated in the straight portion 101*a* and the annular portion 101*b* of the groove 101 of the farthest heat receiving plate 93. More specifically, the heat receiving portion 95*b* is accommodated in the straight portion 101*a* of the groove 101 in positions parallel to the front-rear direction and lined up in the left-right direction, and is accommodated in an annular shape in the annular portion 101*b* of the groove 101. At this time, in the vicinity of the fixing piece 103 of the groove 101, the cooling tube 95 is fixed to the fixing piece 103 in a state slightly sunk downward from the opening 101*x* of the groove 101 (see FIGS. 8 and 9A). When the cooling tube 95 is accommodated in the groove 101 in this way, an upper portion of the cooling tube 95 protrudes above the heat receiving plate 93.

Referring again to FIG. 7, a connecting portion 95*c* connected to the heat receiving portion 95*b* is arranged between the notch 93*a* of the heat receiving plate 93 farthest from the heat dissipating portion 91 and the notch 93*a* of a heat receiving plate 93 second farthest from the heat dissipating portion 91. The heat receiving portion 95*b* connected to the connecting portion 95*c* is accommodated in the groove 101 of the second farthest heat receiving plate 93 in the same manner as described above. Furthermore, a connecting portion 95*c* connected to the heat receiving portion 95*b* is arranged between the notch 93*a* of the heat receiving plate 93 that is the second farthest from the heat dissipating portion 91 and the notch 93*a* of the heat receiving plate 93 that is the third farthest from the heat dissipating portion 91. The heat receiving portion 95*b* connected to the connecting portion 95*c* is accommodated in the groove 101 of the third farthest heat receiving plate 93 in the same manner as described above. Furthermore, the connecting portion 95*c* connected to the heat receiving portion 95*b* is arranged between the notch 93*a* of the heat receiving plate 93 which is the third farthest and the notch 93*a* of the heat receiving plate 93 which is closest to the heat dissipating portion 91. The heat receiving portion 95*b* connected to the connecting portion 93*c* is accommodated in the groove 101 of the nearest heat receiving plate 93 in the same manner as described above. The return portion 95*d* connected to the heat receiving portion 95*b* is disposed between the notch 93*a* of the nearest heat receiving plate 93 and the heat dissipating portion 91.

Figure 10:
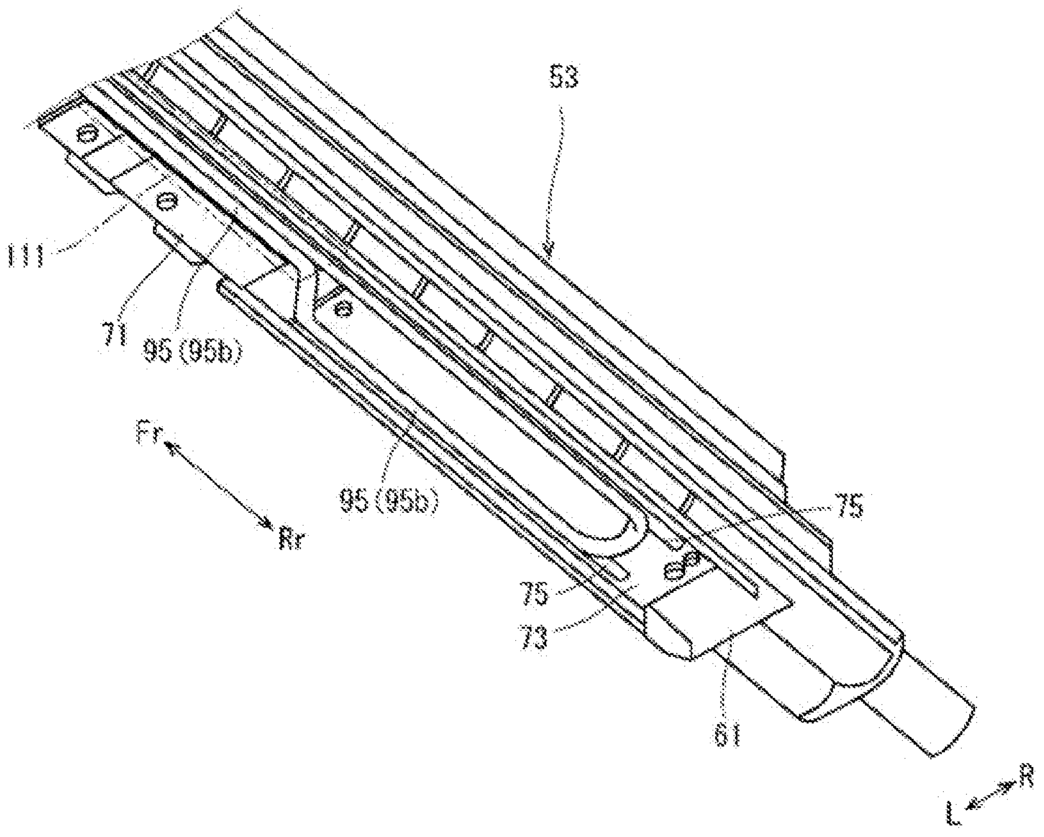
FIG. 10 is a perspective view of a developing device and a cooling tube viewed from below in an image forming apparatus of an embodiment according to the present disclosure.

The cooling tube 95 and the developing device 53 will be explained with reference to FIG. 10. FIG. 10 is a perspective view of the developing device 53 and the cooling tube 95 viewed from below. As shown in FIG. 10, the cooling tube 95 (heat receiving portion 95*b*) accommodated in the straight portion 101*a* of the groove 101 of the heat receiving plate 93 (not shown in FIG. 10) is arranged on the side of the toner density sensor 71. The cooling tube 95 (heat receiving portion 95*b*) accommodated in the annular portion 101*b* of the groove 101 of the heat receiving plate 93 is arranged along the bottom plate 73.

When the developing device 53 is pivotted to the developing position (see FIG. 3A), the upper portion of the cooling tube 95 accommodated in the heat receiving plate 93 enters the recessed portion 75 of the bottom plate 73 fixed to the bottom portion of the developing housing 61 and is in contact with the bottom plate 73. In addition, a part of the heat receiving plate 93 may be in contact with the bottom plate 73.

In the image forming apparatus 1 having the above configuration, the cooling action of cooling the developing device 53 by the cooling unit 41 and the cooling unit 41 when the developing device 53 is removed will be described. The cooling unit 41 operates during an image forming operation, that is, while the developing device 53 is operating. During operation of the developing device 53, the temperature inside the developing housing 61 increases due to frictional heat generated by the stirring action of stirring the developing agent, and the temperature of the bottom plate 73 fixed to the bottom portion of the developing housing 61 also increases. In addition, the heat of the bottom plate 73 is transmitted to the heat receiving plate 93 and the cooling tube 95 of the cooling unit 41 that are in contact with the bottom plate 73, and the temperatures of these also rise.

In the heat dissipating portion 91 of the cooling unit 41, a pump is driven to pump the cooling liquid from the tank to the cooling tube 95. When the cooling water passes through the cooling tube 95 and reaches the heat receiving plate 93, the heat transmitted to the heat receiving plate 93 and the cooling tube 95 is absorbed by the cooling water, and the temperature of the cooling water increases. In this way, the heat of the bottom plate 73 is taken away by the cooling water via the heat receiving plate 93 and the cooling tube 95, and thus an increase in the temperature of the bottom plate 73 is suppressed. That is, an increase in the temperature of the developing housing 61 is suppressed.

The cooling water passes through the cooling tube 95 via the four heat receiving plates 93 and returns to the heat dissipating portion 91. The cooling water that has returned to the heat dissipating portion 91 is cooled by the cooling fan and then supplied to the tank. The cooled cooling water passes through the cooling tube 95 and circulates between the heat dissipating portion 91 and the four heat receiving plates 93.

As described above, the developing device 53 is removed from the support frame 7 during maintenance or replacement of the developing device 53. At this time, after opening the outer cover, the inner cover 5 is opened as shown in FIG. 2B. When the inner cover 5 is opened, as described with reference to FIGS. 6A and 6B, the slide member 85 is moved by the link member 87, and the developing device 53 pivots from the developing position to the separated position. When the developing device 53 pivots to the separated position, the developing roller 67 separates from the photoconductor drum 55, and the developing housing 61 separates upward from the heat receiving plate 93 and the cooling tube 95, as shown in FIG. 3B. After that, the developing device 53 is pulled out forward through the opening of the housing 3. At this time, the developing roller 67 is separated from the photoconductor drum 55, and thus damage to the photoconductor drum 55 by the developing roller 67 is suppressed, and since the cooling tube 95 is also separated from the developing housing 61, the cooling tube 95 is prevented from being damaged by the developing housing 61.

As described above, with the technique according to the present disclosure, by mainly cooling the bottom plate 73 with the cooling unit 41, an increase in temperature in the developing device 53 can be efficiently suppressed. Furthermore, when removing the developing device 53, the developing device 53 can also be separated from the cooling unit 41 (cooling tube 95) by an operation of separating the developing roller 67 from the photoconductor drum 55. Thus, the developing device 53 can be removed from the support frame 7 without damaging the cooling unit 41 (cooling tube 95).

In addition, the cooling tube 95 is arranged along the surface of the bottom plate 73, and thus the heat of the bottom plate 73 can be efficiently transferred to the cooling water. Moreover, near the fixing piece 103 of the groove 101, the cooling tube 95 is fixed with the fixing piece 103 in a state slightly sunk downward from the opening 101*x* of the groove 101, and thus the cooling tube 95 can be easily accommodated in the groove 101.

Furthermore, the shape of the bottom portion of the developing housing 61 may be changed depending on the dimensions, configuration and the like of the toner density sensor 71. In this case, the shape of the heat receiving plate 93 of the cooling unit 41 is also changed. At this time, for example, the upper surface of the cooling tube 95 accommodated in the straight portion 101*a* of the groove 101 may be higher than the bottom plate 73. In such a case, the bottom plate 73 and the cooling tube 95 may interfere with each other when the developing device 53 is removed. Therefore, in such a case, as shown in FIG. 10, it is preferable to provide a cover plate 111 that covers the cooling tube 95 accommodated in the straight portion 101*a* of the groove 101. The cover plate 111 is fixed to the heat receiving plate 93 by screw fastening, for example.

Although the technique according to the present disclosure has been described with respect to particular embodiments, the technique accoding to the disclosure is not limited to the embodiments described above. Those skilled in the art can modify the embodiments described above without departing from the scope and spirit of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a photoconductor drum supported by a support frame and on which an electrostatic latent image is formed;

a developing device that is detachably supported by the support frame and includes a developing roller configured to develop the electrostatic latent image formed on the photoconductor drum with a developing agent, and a developing housing configured to store the developing agent;

a separating mechanism configured to move the developing device so that the developing roller separates from the photoconductor drum before the developing device is removed from the support frame; and a cooling unit configured to cool the developing device; wherein the developing housing has a bottom plate that has higher thermal conductivity than other parts;

the cooling unit includes:

a heat receiving plate facing the bottom plate; and a cooling tube supported by the heat receiving plate;

in a state where the developing device is not being moved by the separating mechanism, the bottom plate comes in contact with the cooling tube and the cooling unit cools the developing device; and when the developing device is moved by the separating mechanism before the developing device is removed from the support frame, the bottom plate is separated from the cooling tube; and the bottom plate has a recessed portion into which a part of the cooling tube enters when the developing device is not being moved by the separating mechanism.

2. The image forming apparatus according to claim 1, wherein the cooling tube is arranged along the surface of the bottom plate.

3. The image forming apparatus according to claim 1, wherein the heat receiving plate has a groove into which the cooling tube is fitted, an opening formed in a bottom surface of the groove, and a fixing piece formed above the opening and protruding from an edge of the groove toward inside of the groove; and the cooling tube is fixed to the fixing piece in a state sunken downward from the opening.

4. The image forming apparatus according to claim 1, wherein the developing housing includes a sensor configured to detect a developing agent density, and the cooling tube is arranged to avoid the sensor.

5. The image forming apparatus according to claim 1, wherein the cooling unit includes a cover plate that covers the part of the cooling tube; and the cover plate is fixed to the heat receiving plate.

* * * * *